Patented Jan. 28, 1936

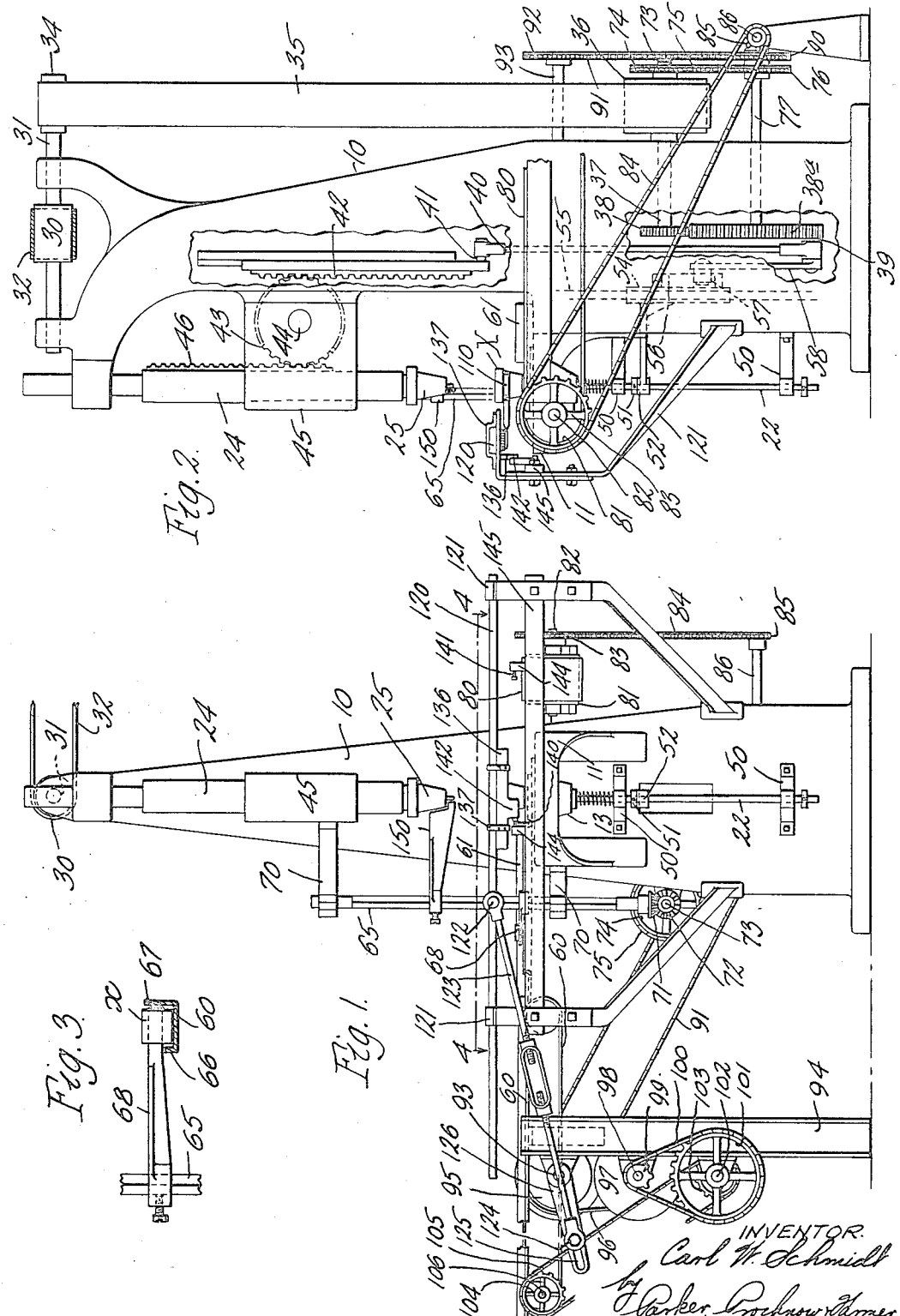

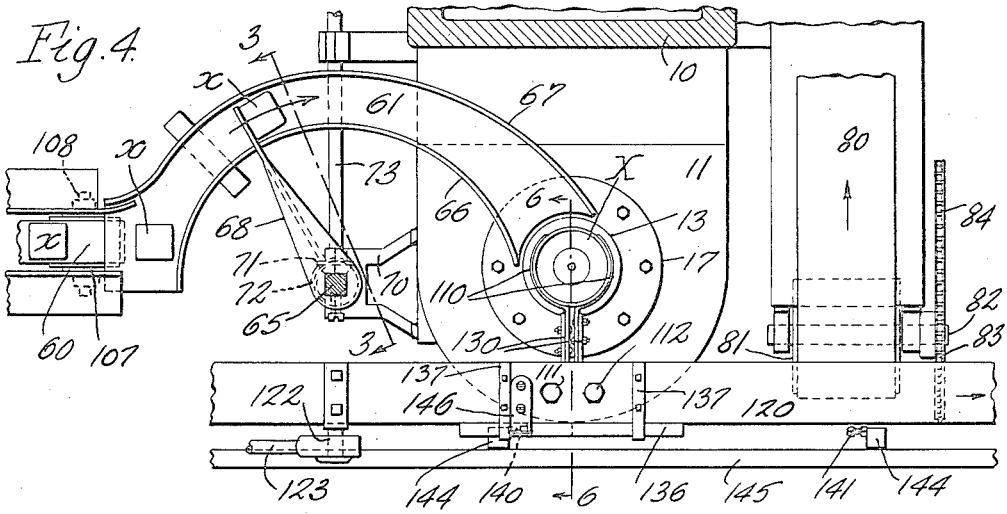
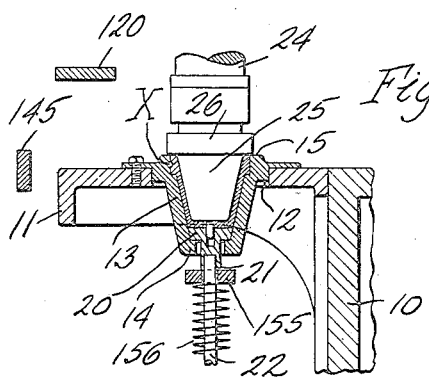
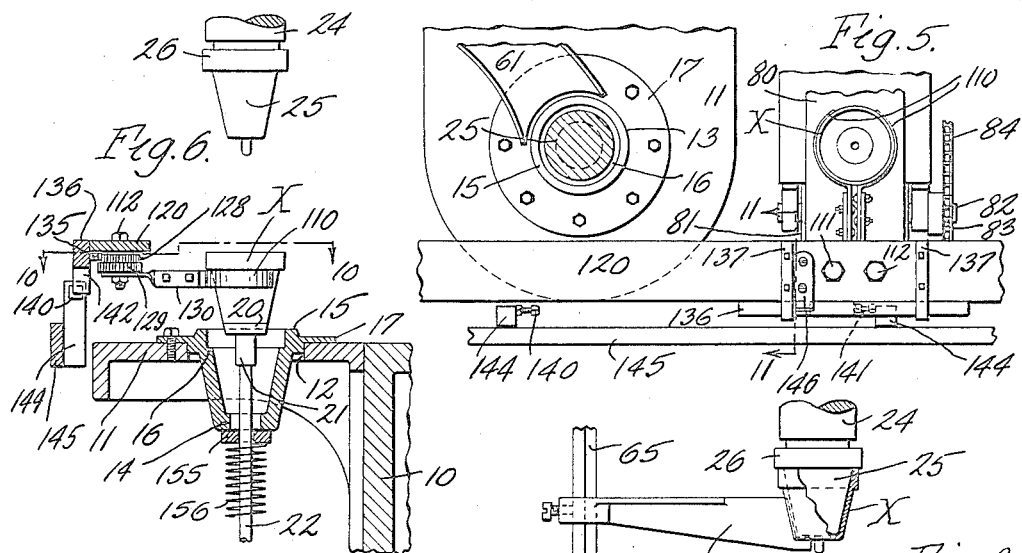
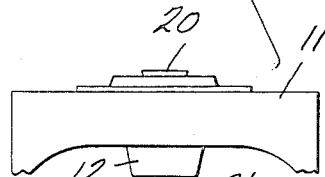
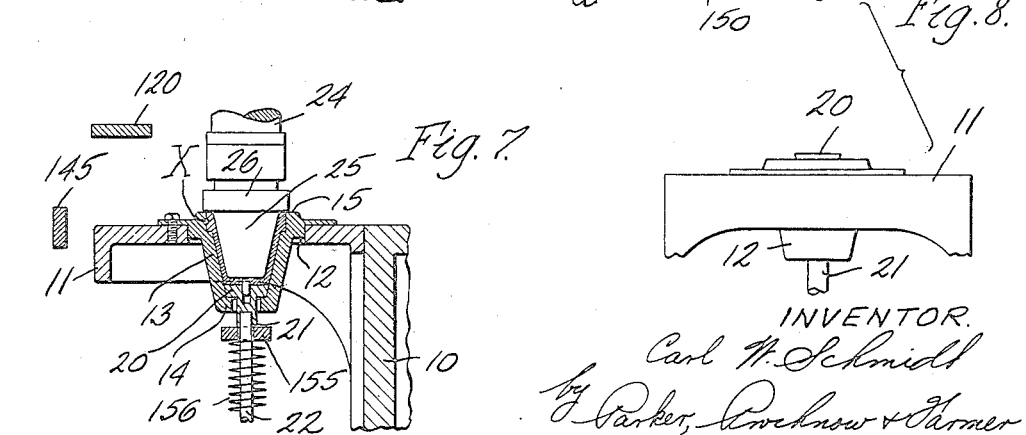

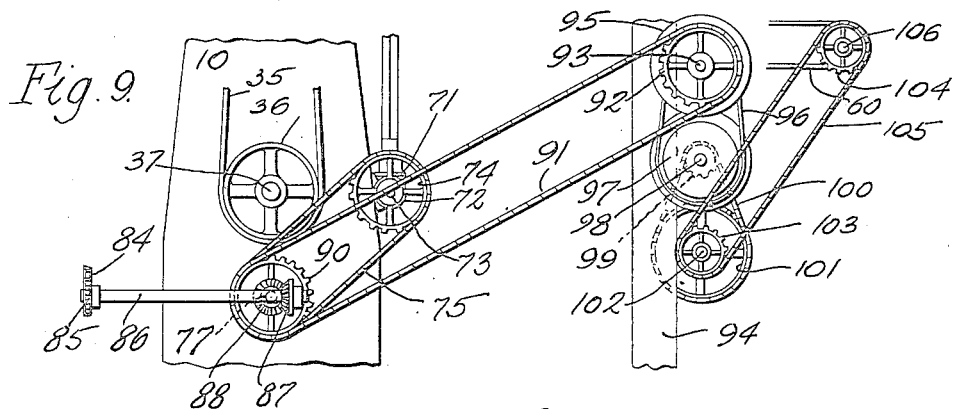
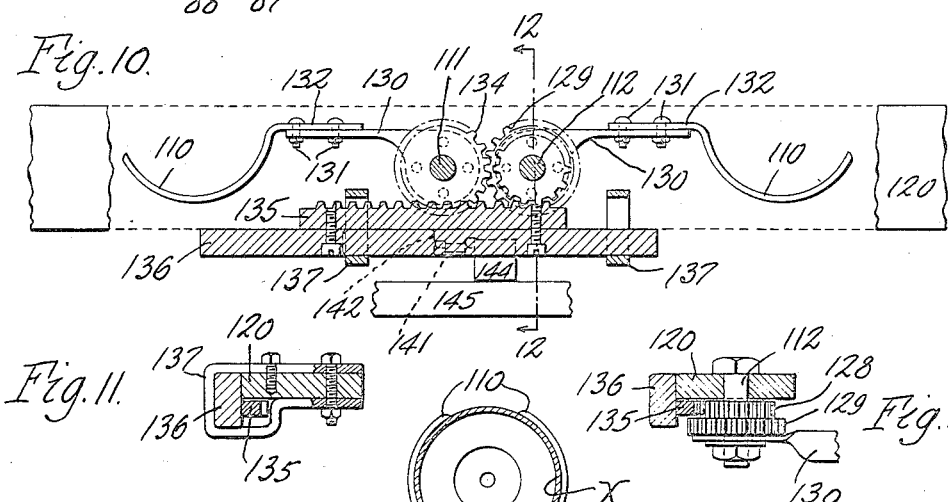
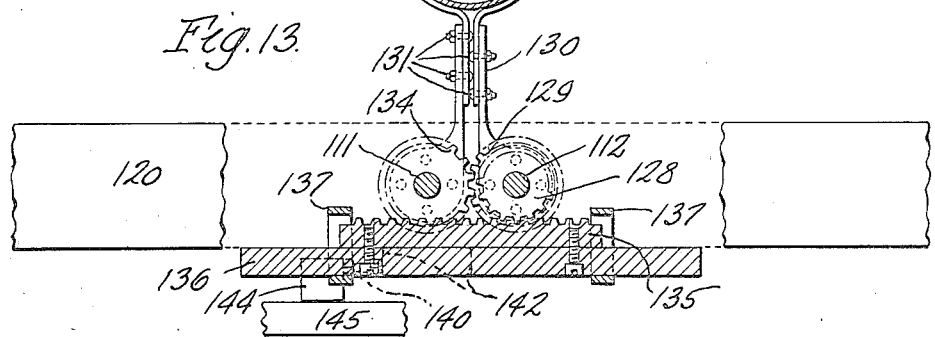

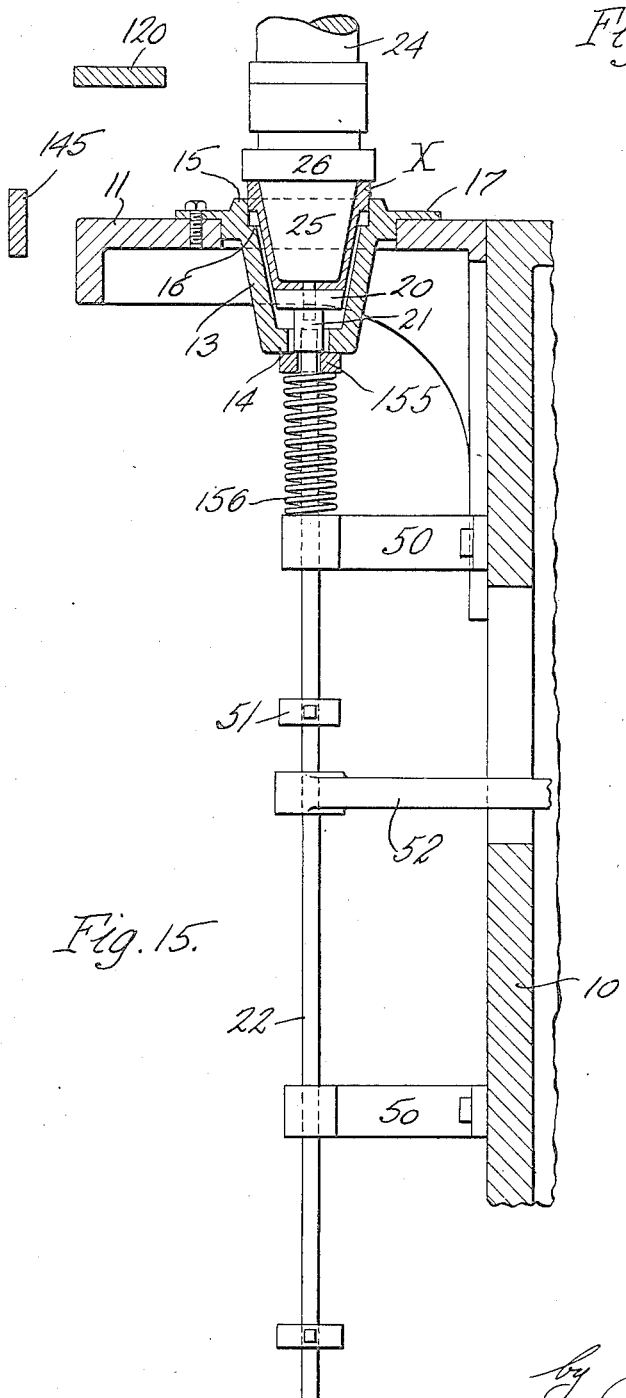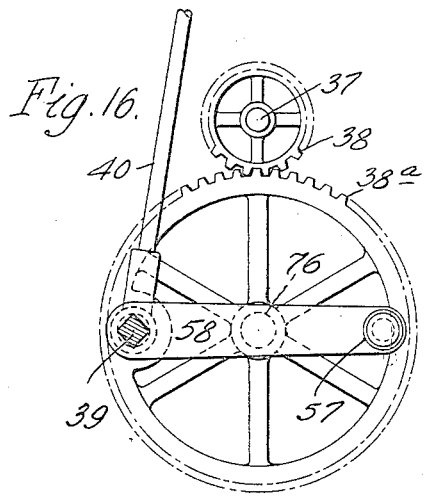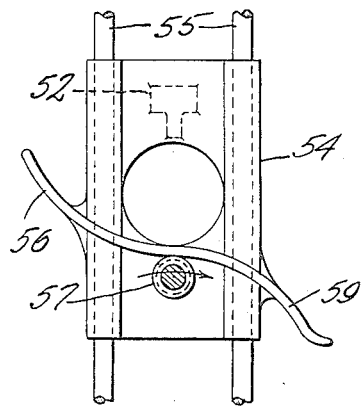

2,029,084

UNITED STATES PATENT OFFICE 2,029,084

FLOWERPOT MAKING MACHINE

Carl W. Schmidt, Buffalo, N. Y.

Application September 18, 1934, Serial No. 744,541

7 Claims. (Cl. 25—24)

This invention relates to improvements in machines for molding articles from plastic material, and has particular reference to machines for molding flower pots from portions of clay.

Machines for this purpose usually include one or more molds, which conform to the outside shape of the article to be produced and one or more cores, each of which cooperates with a mold to press the material between itself and the inside wall of the mold to form the article. In the simplest form of machines of this kind there is a single mold and a single cooperating core axially aligned therewith, one of which is reciprocable relatively to the other upon that axis. After forming the article the core recedes and suitable means then ejects the article out of the mold, after which the operative is required to reach in and place his hand into the path of the reciprocable member to remove the ejected article.

There is considerable danger with such procedure, and in order to overcome or minimize the danger to some extent machines have been provided wherein a plurality of molds are arranged so as to move one after another into the axis of the reciprocating core to form the article, while the formed article is ejected from the molds in a position other than beneath or in the axis of the reciprocating core. This necessitates duplication of parts and consequent additional care in maintaining proper adjustment, increased wear and replacement, in addition to which the article still has to be removed by hand. Even with trained operatives hand removal causes blemishes and deformation of the soft molded articles.

Other machines have been devised in which automatic means of various kinds have been provided for the removal of the molded articles to some form of discharge device which carries them away from the machine. Such machines, however, are very expensive and entail the use of a greatly increased number of parts requiring constant adjustment and care in order to enable the machine to function properly. Some of these article removing means are in the form of pushing devices which are only partially successful since, in the first place, they are liable to cause blemishes where they engage the soft articles, and at other times they do not properly remove or position the articles where required. Rotary devices including carrying arms have also been suggested for this purpose, but it has been found that in order to prevent the pots or articles from falling off the arms during the rotation of the articles from the ejected position to the discharge position, it has been necessary to operate the rotary discharge means relatively slowly, thus limiting the production of the machine.

The objects of this invention are to construct a machine for molding articles from plastic material in which only a single mold and a cooperating core is necessary and with which the articles can be automatically removed directly from the axis of the mold and core and released in a required position; also with which the molded articles can be formed with such rapidity that a relatively simple machine of low cost will be enabled to equal or exceed the production of far more costly machines, and whereby the number of parts required are few in number and require the minimum of attention to maintain the machine in proper operative condition.

Other objects of the invention are to construct a machine of this character with which portions of the material to be molded are automatically fed or introduced into the mold in an improved and simplified manner in proper timed relation with the movements of the reciprocable core; with which the molded articles may be ejected from the mold by ejector means of improved construction operable in a superior manner to ejecting means heretofore provided, so that the articles are gently shifted or eased out of the mold so as to prevent deformation of the articles by the pressure of the ejecting means with the articles.

In machines of this kind, particularly when forming flower pots or other hollow articles, it occasionally happens that a portion of the plastic material, or a molded and ejected article, instead of remaining in supported position upon the ejector, clings to the reciprocable core in its movement to its retracted position and under former conditions, it has been necessary for the operative to remove the article clinging to the core by hand in some manner, which is not only dangerous but a make-shift and clumsy operation. In addition to this, if the molded article clinging to the core is not noticed, it will be introduced into the mold upon the next stroke of the core and since, in the interval, another portion of the plastic material has already been introduced into the mold to form the next article, the machine becomes jammed with possible disastrous results.

It is a further object, therefore, of the invention to provide a machine with which such an article or any material clinging to the core is automatically removed after the core has been withdrawn from the mold and before it re-enters the same for the next operation.

Other objects and advantages of the invention will be apparent from the following disclosure thereof and will be particularly pointed out in connection with the appended claims.

In the drawings:

Fig. 1 is a front elevation of a machine for forming molded articles from plastic material, embodying my invention.

Fig. 2 is a side elevation thereof, partly in section.

Fig. 3 is a fragmentary section thereof taken approximately on the line 3—3 of Fig. 4 illustrating the means for feeding the portions of plastic material to the mold of the machine.

Fig. 4 is a horizontal section of the machine on an enlarged scale taken approximately on the line 4—4, Fig. 1.

Fig. 5 is a similar view showing some of the parts of Fig. 4 in another position.

Fig. 6 is a transverse, vertical section of the machine on the line 6—6, Fig. 4.

Fig. 7 is a similar view illustrating the parts in another position.

Fig. 8 is a fragmmentary side view illustrating the operation of the automatic means for removing a formed article or material from the core after it has been withdrawn from the mold.

Fig. 9 is a rear view of a portion of the machine showing the means for driving the various parts thereof in timed relation.

Fig. 10 is a fragmentary horizontal section taken approximately on the line 10—10 of Fig. 6 illustrating a part of the article removing means on a larger scale and in a different position to that shown in Fig. 6.

Fig. 11 is a transverse, vertical section, on an enlarged scale, of part of the machine taken approximately on the line 11—11, Fig. 5.

Fig. 12 is a similar view on the line 12—12, Fig. 10.

Fig. 13 is a fragmentary horizontal section similar to Fig. 10, but showing the parts in different operative relation.

Fig. 14 is a transverse, vertical section, showing a detail of the article removing means.

Fig. 15 is a fragmentary transverse vertical section of the machine, showing my improved means for ejecting molded articles from the mold.

Fig. 16 is a fragmentary vertical view of part of the drive mechanism of the machine.

Fig. 17 is a similar view partly in section, of the means for actuating the article ejector.

For the sake of clarity and brevity of description the molded articles will hereinafter be referred to as "pots", but it should be understood that the invention is in nowise limited to the production of flower pots, since various features of this invention can be employed in the production of molded articles of other kinds or forms.

In its general organization, the machine illustrated in the drawings can be of well-known form, that shown (see Figs. 1 and 2) comprising an upright main frame or column 10 of hollow construction and including between its upper and lower ends a forwardly projecting bed-plate 11 having an aperture therein in which is removably secured a mold 12. Portions of plastic material are introduced one at a time into this mold to form the pots. The mold 12 is of hollow form having an annular tapered side wall 13, an apertured bottom wall 14, and a horizontal top rim or face 15 below which is an inwardly extending annular shoulder 16 which conforms to the rim or shoulder of the flower pot indicated at X. The mold 12 is preferaby provided with a flange 17 which engages the top face of the bed-plate 11 and is provided with holes for the reception of bolts for rigidly securing the mold in place. This construction permits the interchange of molds of various sizes.

Within the mold 12, at the lower end thereof, there is arranged the head 20 of an ejector. This head comprises a disk having a tapered annular edge which fits the bottom of the mold and a depending axial stem 21 which extends through the central aperture in the bottom wall 14 of the mold and is secured upon the upper end of a vertical rod 22. This rod is arranged to reciprocate between the lower position of the ejector shown in Fig. 7 to an upper position illustrated in Figs. 1, 2 and 6 in which the pot is supported by the ejector in position for removal from the machine.

Arranged in vertical axial alignment with and above the mold 12 is a reciprocatory member 24 upon the lower end of which a core 25 is secured, the shape of which corresponds to the shape and dimensions of the inner surface of the pot to be formed. The core 25 is movable by means of the reciprocatory member 24 from an upper position illustrated in Figs. 1 and 2 to the lower position illustrated in Fig. 7 in which it enters the mold and cooperates therewith to press the portion of material therein into the form of the pot. The core 25 is provided with an upper annular enlargement 26 which cooperates with the top marginal rim 15 of the mold to finish off the horizontal top edge of the pot X. In addition to its reciprocatory motion the core 25 is preferably rotated by suitable means whereby the material which is being molded is given rotary action in the mold at a speed which is less than the speed of rotation of the core itself due to the relative slipping of the material between the stationary mold and the rotating core. This action produces a smooth finish or surface on the pots. The rotary motion of the core 25 also facilitates the withdrawal of the core from the finished pot.

The means for driving the machine and for operating the reciprocatory member 24 and its core 25 includes a pulley 30, Fig. 2, secured upon a horizontal shaft 31 mounted at the upper end of the column 10 and which is rotated by a belt 32 deriving its power from a suitable source, not shown. The shaft 31 is provided with a second pulley 34 which is connected by a belt 35 to a pulley 36 fixed upon a horizontal shaft 37, journalled in the lower part of the column 10. Within the column 10, (see Fig. 2) the shaft 37 is provided with a pinion 38 meshing with and driving a gear 38a, having eccentrically arranged thereon a stud 39 to which one end of an upright link or crank member 40 is pivoted. The other end of this link or crank 40 is pivoted to a stud 41 on the lower end of a vertical rack member 42 suitably guided in the column and which meshes with and drives a gear wheel 43 fixed upon a horizontal shaft 44 mounted in a bracket 45 extending forwardly from the upper part of the column 10. Within this bracket 45, at the opposite side of the shaft 44 to that of the rack 42, is arranged a vertical guide in which the reciprocatory member 24 slidably engages. This member 24 is provided with a rack 46 corresponding to the rack 42 and which meshes with the gear wheel 43 in opposition to the rack 42 before mentioned. It will be obvious from the foregoing that the rotation of the pinion 38 on the shaft 37 will, through the described connections, effect a reciprocatory motion of the rack 42 and a corresponding reciprocation of the member 24, but in an opposite direction. The means used for effecting rotary motion of the core 25 are not shown, since structures of the kind described are well known in the art, and the foregoing general description of the organization of the machine is thought to be sufficient since, as thus far described, it forms, of itself, no part of the present invention.

The rod 22 of the ejector 20, see Fig. 15, is guided in its reciprocatory vertical movements in brackets 50 secured to and projecting forwardly from the front of the column 10. There is secured upon the rod 22 an adjustable collar 51 which is engageable by a horizontal arm or actuating member 52 which extends forwardly through a vertical slot in the front wall of the column 10 and has its front end apertured to surround the rod 22. The rear end of the member 52 is secured upon a slide 54 (see Figs. 2 and 17) which is guided for up and down movements upon a pair of parallel, upright rods 55 mounted in the hollow lower portion of the column. The slide 54 is provided with a transverse cam bar 56 which is operatively engaged by a suitable roller or operating member 57 secured upon the free end of an arm 58 which extends crosswise of and in front of the gear wheel 38a and is rigidly secured at its opposite end upon the stud 39 on which the crank or link 40 is pivoted. The rotation of the gear wheel 38a, through the described connections, causes an up and down motion of the slide 54 by the engagement of the roller 57 with the cam 56, this movement in turn imparting corresponding motion to the ejector rod 22. The cam bar 56 is formed with a portion 59 forming a dwell so positioned that when the ejector head 20 reaches its upper position shown in Fig. 6, the motion of the ejector will be arrested and the pot X thereon will be stationarily supported in this position for a time sufficient for the pot removing means, (which will be described later) to move into operative relation with and remove the pot. When the roller 57 passes out of engagement with the cam bar 56, the slide 54 and ejector 20 will return to their lower positions by gravity, in readiness for another upward movement by the roller 57.

Except as hereinafter described, the ejector and its actuating mechanism can be of any suitable form and construction which will enable it to function as set forth above.

The plastic material of which the pots are formed is divided or prepared in uniform portions x and these portions are placed by hand or by suitable mechanism, if desired, upon a traveling conveyor or belt 60, Figs. 1 and 4. Positioned between the discharge end of this conveyor 60 and the mold 12 is a horizontal chute or channel 61. This trough 61 is of arcuate form with its center of curvature disposed approximately upon the center of an upright rotatable shaft 65 journalled in brackets 70 on the column 10. The trough 61 has an inner relatively shallow upright wall 66 and an outer wall 67 which is preferably somewhat higher than the inner wall 66.

Secured to the shaft 65 before mentioned, (see Fig. 3) is a horizontal arm or sweep 68, the free end of which is positioned so as to pass closely over the top edge of the inner wall 66 and is of a length to engage and move with it the portions x of the material, one portion with each rotation of the shaft 65 and the arm 68. The shaft 65 is operatively connected so as to rotate at a proper speed and in timed relation to the movements of the core 25 to deliver portions of material to the mold in alternation with the descent of the core 25 into the mold 12. The means for thus actuating the shaft 65 (see Figs. 1, 4 and 9) includes a bevel gear 71 fixed on the lower end of the shaft in mesh with a corresponding gear 72 on a horizontal rearwardly extending shaft 73 journalled in brackets upon the side of the column 10. The shaft 73 is in turn provided with a sprocket wheel 74 which is connected by a chain 75 to another sprocket wheel 76 secured upon a horizontal shaft 77 journalled in the lower end of the column 10. This shaft carries the gear 38a before mentioned, and through the shaft 37 and pinion 38 receives power from the main shaft 31 of the machine. Any other suitable means may be provided for driving the shaft 65 at the required speed.

At the side of the bed-plate 11 and mold 12 remote from the chute 61 there is arranged a horizontal belt or conveyor 80, the front end of which passes over a pulley 81. The belt 80 is arranged so that its upper run travels rearwardly and is positioned to receive the pots after they have been ejected and removed by the pot removing means, to be later described. The pulley 81 is secured upon a transverse horizontal shaft 82 to which is also secured a sprocket wheel 83. This sprocket wheel is connected by a chain 84 to a small sprocket 85 on another transverse horizontal shaft 86 mounted at the rear of the machine and which shaft is in turn provided with a bevel gear 87 meshing with and driven by a companion bevel gear 88 upon the rear end of the horizontal shaft 77 before mentioned.

The conveyor 60 for delivering the portions of material to the trough 61 is also driven from the shaft 77, the means shown (see Figs. 1 and 9) including a sprocket wheel 90 fixed upon the shaft 77 between the sprocket 76 and the bevel gear 88. This sprocket wheel 90 is connected by a chain 91 to another sprocket 92 upon a horizontal shaft 93 mounted in suitable bearings upon a frame member 94 at one side of the machine. This shaft 93 is also provided with a cone pulley 95 connected by a belt 96 to a second cone pulley 97 on a parallel shaft 98, also mounted upon the frame member 94. The shaft 98 has also a sprocket pinion 99 secured thereon which actuates a chain 100 for turning a sprocket wheel 101 upon a third shaft 102 mounted on the member 94. The shaft 102 is connected by sprockets 103, 104 and a chain 105 to a horizontal shaft 106 which is provided with a pulley which receives one end of and drives the conveyor 60. The other end of the conveyor 60, in turn, passes around a pulley 107 upon a shaft 108 which is journalled adjacent and below the receiving end of the trough 61, the parts being so related that the portions x of material will be discharged from the conveyor 60 upon that end of the trough 61, at suitable intervals to be engaged by the sweep 68 and delivered thereby to the mold 12, as described.

In accordance with this invention, the means for engaging the ejected pots as they come to rest above the upper end of the mold 12, includes a pair of oppositely arranged, horizontal curved arms or members 110 mounted upon or carried by vertical pivots or shafts 111, 112, so as to swing from an open position such as is shown in Fig. 10 to a closed position as illustrated in Figs. 4, 5 and 13. These arms 110 are operable to move to their closed position in which their curved portions are approximately concentric with the axis of the mold 12 and core 25 (see Figs. 4, 5 and 13) in which position their upper edges are directly under the shoulder on an ejected pot. This movement of the arms occurs during the dwell or interval of time during which the pot comes to rest in its ejected position as described, so that when the ejector 20 subsequently returns to its lower position in the mold, the pot will be supported in its ejected position by the engagement of its shoulder upon the arms 110. The arms are then operable to move with the pot supported thereon to a position over the conveyor 80 with the bottom face of the pot close to the upper run thereof. The arms 110 are then quickly moved to their open position, as shown in Fig. 10, to release the pot upon the conveyor, to be carried away thereby. The cycle of movement of the pot removing means is completed by the return of the opened arms to a position opposite the mold 12, whereupon they will be again closed to receive and carry away the next pot which has been formed and ejected.

The means for mounting and operating the arms 110 will now be described. Extending from side to side of the machine at the front thereof (see Fig. 1) is a horizontal carriage or bar 120, the end portions of which slidably engage in aligned holes or guides in a pair of upwardly extending brackets 121 secured to and projecting from the column 10. This carriage or bar 120 is reciprocable in its guide 121, having for this purpose one end 122 of a link 123 pivotally connected thereto. The other end of the link 123 is adjustably pivoted at 124 to the slotted outer end 125 of a crank or rotary arm 126 fixed upon the front end of the shaft 93, before mentioned.

The pivots or shafts 111—112 for the arms 110 are mounted intermediate of the ends of and upon the carriage 120, as shown in Figs. 4, 5, 10 and 12, and directly below the carriage or bar 120 one of the shafts, for example, the shaft 112, is provided with a pinion 128 which is in turn secured to the top face of a spur gear 129 mounted upon said shaft 112. Upon the lower face of this gear 129 there is secured a bracket 130 which extends away from the gear and is provided with fastening devices 131 by which an attaching portion 132 of one of the arms 110 can be adjustably secured to the bracket.

The gear 129 meshes with a companion gear 134 upon the other pivot shaft 111 and this gear is in turn also provided with a bracket 130 similar to the bracket 130, just described, and to which the attaching portion 132 of the other arm 110 is similarly secured. This construction facilitates the attachment and removal of arms having different curvatures to fit pots of varying diameters It will be obvious that rotation of one of the gears 129, 134 will cause the arms 110 to swing about their shafts in unison and in opposite directions or towards and from each other.

To effect such actuation of the arms 110, I provide a rack bar 135 which extends horizontally beneath the carriage bar 120 so as to operatively engage the pinion 128. This rack 135 is secured upon a side face of a block 136 disposed in engagement with the front edge or face of the carriage 120 and is slidable relatively thereto in guides 137 secured upon the carriage 120. Endwise movement, therefore, of the block 136 in either direction in its guides will cause the rack 135 to effect rotation of the pinion 128 and thereby actuate the arms 110 to open or closed position, in accordance with the direction of movement of the block 136.

To cause the proper actuation of the arms to their closed and open positions to respectively engage a pot in ejected position over the mold 12 and to discharge the pot upon the conveyor 80, I provide suitable adjustable stops 140, 141, Figs. 1, and 4-6, which are stationarily positioned to be engaged by an abutment or depending portion 142 on the sliding block 136. These stops are so disposed that they will alternately intercept the abutment 142 and retard further movement of the block 136 with the carriage 120 just prior to the termination of the stroke of the carriage in each direction. The adjustable stops 140, 141 may be in the form of screws or bolts having threaded engagement in holes in upright posts or supports 144 secured upon a fixed horizontal bar or plate 145 extending in parallel relation to and below the carriage 120, being secured for this purpose to the brackets 121.

The operation of the mechanism just described is as follows: Assuming the arms 110 to have been just moved to their closed position in operative relation to an ejected pot disposed on the axis of the mold 12 and core 25, the movement of the crank arm 126 will be such that the carriage 120 will be started in its reciprocatory movement towards the right in Figs. 1 and 4 with the arms in the position described and supporting the pot. The carriage, the block 136, the rack 135, and the arms 110 will all remain in the same relation to each other in the continued movement of the carriage towards the right as explained, until such time as the arms 110 have carried the pot into position over the conveyor 80. The right hand stop 141 is so positioned that it will at this time be engaged by the depending abutment 142 on the sliding block 136, thereby preventing further movement of this block towards the right. The carriage 120, however, will continue its movement towards the right until its stroke is completed, which movement of the carriage relatively to the block 136 will cause the rack 135 carried by the block to effect a rotation of the pinion 128 through a movement of approximately 90°. This consequently causes the two gears 129 and 134 to rotate in unison, and the arms to swing to an open position to release and deposit the pot upon the conveyor 80. The movement of the arms to their open position is so rapid that although the shafts 111—112 are being carried to the right with the carriage the left hand arm 110 will move away from the pot fast enough to prevent it from engaging and tipping the pot over in the continued movement of the carriage during the completion of its stroke towards the right.

During the time that the pot is being carried toward the right, as explained, the sweep 68 will be moved by the rotating shaft 65 so as to engage and carry forward another portion x of material and deposit it in the mold, and approximately at the time that the pot is released and deposited upon the conveyor 80, the core 25 will have moved into operative relation to the mold 12 to form another pot.

Upon the return of the carriage 120 in the opposite direction the arms 110 will remain in their open position into which they were actuated by the engagement of the abutment 142 with the stop 141, and during this travel of the carriage toward the left, the core 25 will move upwardly out of the mold and at the same time the pot which has just been formed will be ejected and will come to rest, as shown in Fig. 6, in position for removal. The left hand stop 140 is so positioned that the abutment 142 will engage it and cause the block 136 to be retarded relatively to the carriage, and by the continued movement of the carriage the gears 129, 134 will rotate in unison, in directions opposite to their rotative movement just described. By this movement the arms 110 will swing to their closed positions. This action takes place directly in front of the mold 12 so that as the arms 110 swing to their closed positions they will move into operative or supporting relation to the pot.

It will be seen that by the arrangement of the stops, as described, the rack 135 is shifted endwise in one direction and then another to alternately open and close the arms 110 just prior to the completion of the stroke of the carriage in each direction. Thus, the carriage, when moving toward the right, will move the closed arms and the pot resting thereon with it to a position in which it is desired to release the pot, and the arms will then be opened to release the pot. The arms are then carried in open position in the opposite direction until the rack is again actuated to close the arms.

I preferably provide some means for preventing back-lash and over-running of the rack bar 135, such for example, (see Fig. 14) as a leaf spring 146 mounted upon the carriage 120 and which frictionally bears upon the top edge of the block 136. Any other suitable means may, however, be used.

The means which I provide for removing any pot or any material which adheres to the core 25 after it leaves the mold and ascends to its upper position, comprises an arm or blade-like tool 150 which is preferably secured upon and extends horizontally from the shaft 65 which carries the sweep 68. This tool 150 is disposed approximately opposite the position which the core 25 assumes at the upper end of its stroke and the tool at its free end has its edge formed so as to closely approximate a side and a portion of the bottom of the core, as shown clearly in Fig. 8. Each time that the core 25 reaches this position the arm or tool 150 is moved by the shaft 65 so as to move said edge thereof closely past the side and bottom of the core, as shown in Fig. 8 and should there be a pot or portion of material adhering to the core, the rapid rotation of the latter will cause the tool 150 to remove such pot or material by a paring or scraping action. This procedure automatically and completely clears any pot or material from the core, without attention from the operative.

In the removal of the freshly molded pots, it has been found that the molded clay adheres to a greater extent to the wall of the stationary mold 13 than to the rotating core 25 and consequently, if the core is first moved out of engagement with the clay, then the ejector 20 in moving the freshly molded pot out of the mold 13 has a decided tendency to deform the pot. I have overcome this tendency by providing means whereby the ejector 20 is yieldingly moved upward to a slight extent with the core, during the initial upward movement of the core, so that the freshly molded pot is moved out of contact with the wall of the mold while still in contact with the core 25. In order to accomplish this result a washer or disk 155 is provided which is urged by means of a spring 156 against the lower end of the sleeve 21 of the ejector 20, the lower end of the spring 156 in the construction shown engaging the bracket 50. After the initial upward movement of the ejector, the disk 155 contacts with the bottom of the mold or other stop, thus preventing farther upward movement of the ejector by the spring. The ejector 20 is, consequently, normally held by the spring 156 in a position slightly above its lowest position. During the molding of the clay, the core 25 acting on the clay moves the ejector 20 into its lowest position, as shown in Fig. 7, against the action of the spring 156 and immediately upon upward movement of the core 25 after completion of the molding operation, the ejector 20 will follow the upward movement of the core 25 to separate the freshly formed pot from the mold 13. As the core 25 continues its upward movement, it in turn becomes separated from the freshly formed pot, which is then supported in the position shown in Fig. 15 by the spring 156. The removal of the pot from the mold is completed when the arm 52 engages the collar 51 to move the rod 22 upwardly independently of the spring 156 and the disk 155.

The machine shown in the drawings and described constitutes merely one embodiment of this invention and it is not intended to limit the invention to the particular construction shown.

I claim as my invention:

1. In a machine for molding articles from plastic material, a mold and a core axially aligned therewith and one of which is reciprocable toward and into operative relation with the other to mold material introduced into said mold and then away therefrom to separate said core from the molded article, means for ejecting said article out of said mold, and a carriage disposed in lateral relation to said mold and reciprocable crosswise of said mold and having thereon a pair of pivoted, oppositely swingable arms, arm actuating means operable when said carriage approximates one end of its stroke to swing said arms into closed position about opposite sides of said article to support the same while in said ejected position, said closed arms being then movable with said carriage toward the other end of its stroke to carry said article therewith, and said arm actuating means being operable to open said arms and release said article when said carriage approximates said other end of its stroke.

2. In a machine for molding articles from plastic material, a mold and a core axially aligned therewith and one of which is reciprocable toward and into operative relation with the other to mold material introduced into said mold and then away therefrom to separate said core from the molded article, means for ejecting said article out of said mold, and a carriage disposed in lateral relation to and reciprocable crosswise of said mold and having thereon a pair of pivoted, oppositely swingable arms, arm actuating means, a movable abutment on said arm actuating means, a stop engageable by said abutment when said carriage approximates one end of its stroke to arrest further movement of said arms with said carriage and initiate swinging movement of said arms into closed position about opposite sides of said article to support the same while in said ejected position, said closed arms being then movable with said carriage toward the other end of its stroke to carry said article therewith, and a second stop engageable by said abutment when said carriage approximates said other end of its stroke to effect swinging movement of said arms to open position to release said article.

3. In a machine for molding articles from plastic material, a mold and a core axially aligned therewith and one of which is reciprocable toward and into operative relation with the other to mold material introduced into said mold and then away therefrom to separate said core from the molded article, means for ejecting said article out of said mold, and a carriage disposed in lateral relation to and reciprocable crosswise of said mold, a pair of parallel shafts on said carriage, intermeshing gears mounted on said shafts to rotate in opposite directions, an arm supported on each shaft to turn with the associated gears, a pinion on one of said shafts operable to drive said gears and swing said arms in unison, pinion rotating means carried by and movable lengthwise of and relatively to said carriage, a stop engageable by said means when said carriage approaches one end of its stroke, whereby the movement of said means with said carriage is arrested during the remainder of the stroke of said carriage and said pinion is rotated to swing said arms to closed position about opposite sides of said article to support the same, said closed arms and the article thereon being then movable with said carriage during the travel of said carriage in the opposite direction, and a second stop with which said pinion rotating means engages as said carriage approaches the other end of its stroke to similarly arrest said means during the remainder of such stroke, whereby said gears will be rotated in unison in an opposite direction and said arms swung to open position to release said article.

4. In a machine for molding articles from plastic material, a mold, a rotary, reciprocable core axially aligned therewith and movable alternately into said mold to mold material introduced into the latter and thence to a position out of said mold and away from the molded article, and a rotatably mounted tool which is operable to move into close relation to said rotating core each time said core moves to its last named position to scrape therefrom any molded article or any material adhering to said core.

5. In a machine for molding articles from plastic material, a mold, a reciprocable core axially aligned therewith and movable alternately into said mold to mold material introduced into the latter and thence to a position out of said mold and away from the molded article, a rotatable shaft, a scraping tool secured thereon and movable by said shaft into and out of a position closely adjacent said core each time the latter moves away from said mold to scrape therefrom any molded article or any material adhering to said core, and a sweep also secured on said shaft and movable thereby to engage a portion of material and deposit it in said mold each time said core moves away therefrom.

6. In a machine for molding articles from plastic material, a mold, a reciprocable core axially aligned therewith and movable alternately into said mold to mold material introduced into the latter and thence to a position out of said mold and away from the molded article, a rotatable shaft, a scraping tool secured thereon and movable by said shaft into and out of a position closely adjacent said core each time the latter moves away from said mold to scrape therefrom any molded article or any material adhering to said core, a sweep also secured on said shaft and movable thereby to engage a portion of material and deposit it in said mold each time said core moves away therefrom, means for ejecting the molded article from the mold, and means operable for movement to a position over said mold to engage and support the ejected article, carry it thence to a position at one side of said mold and there release said article.

7. In a machine for molding articles from plastic material, a mold, a reciprocable core axially aligned therewith and movable into said mold to mold material introduced into the latter and thence out of said mold to separate the core from the molded article, a reciprocable ejector movable along said axis to shift said article out of said mold, yielding means engaging said ejector to resiliently press the ejector against the molded article and maintain it in contact with said core during the initial movement of the latter out of said mold to thereby ease the article out of engagement with the mold, means which, upon subsequent separation of the core from the article, acts directly upon said ejector to shift it and the molded article thereon to a position out of said mold, and means for removing the molded article from said ejector.

CARL W. SCHMIDT.